United States Patent [19]

Roux

[11] 4,124,929

[45] Nov. 14, 1978

[54] EXTRACTOR FOR WATCH PUSH BUTTONS

[76] Inventor: Jean Roux, Clos a Bec, La Sagne, Switzerland, 2314

[21] Appl. No.: 811,202

[22] Filed: Jun. 29, 1977

[30] Foreign Application Priority Data

Jun. 28, 1976 [CH] Switzerland ........................ 7992/76

[51] Int. Cl.$^2$ .............................................. B23P 19/04

[52] U.S. Cl. .................................... 29/268; 81/5.1 R; 81/421

[58] Field of Search ............ 29/268; 81/5.1, 421–424, 81/302, 125

[56] References Cited

U.S. PATENT DOCUMENTS

| | | | |
|---|---|---|---|
| 945,702 | 1/1910 | Cousino | 81/417 |
| 2,766,649 | 10/1956 | Labry | 81/423 X |
| 3,376,765 | 4/1968 | Ruby | 81/125 X |

FOREIGN PATENT DOCUMENTS

| | | | |
|---|---|---|---|
| 2,032,444 | 7/1970 | Fed. Rep. of Germany | 81/423 |

OTHER PUBLICATIONS

Western Electric, Technical Digest No. 8, Oct. 1967, p. 27.

*Primary Examiner*—James L. Jones, Jr.
*Attorney, Agent, or Firm*—Sherman & Shalloway

[57] ABSTRACT

An extractor for the push button members of wrist watches is disclosed which is in the form of expanding pliers having one of its jaws carrying a pressing stud generally at right angles to the jaw for engaging the sleeve of the push button, while the other jaw of the unit has a portion opposite the stud for bearing against the opposite wall of the watch case to provide a base so that the stud is pressed against the push button sleeve when the handles of the unit are pressed together.

8 Claims, 3 Drawing Figures

EXTRACTOR FOR WATCH PUSH BUTTONS

BACKGROUND OF THE INVENTION

The present invention relates to the repair of watches and is concerned more particularly with a tool for the extraction or ejection of push buttons from the case of wrist or pocket watches.

BRIEF DISCUSSION OF THE PRIOR ART

Many contemporary watches such as chronographs or electronic units include push buttons or setting components such as a sweep hand or for activating various functions such as the energization of LED read-outs. Therefore, the repair of such watches frequently requires the removal of such push buttons.

Heretofore, these buttons have been removed either by the use of a pair of pliers engaging the external portion or head of the button or by a drift or driving instrument which was tapped or hammered against the internal portion of the button to effect its removal. With the use of pliers, the push buttons suffer considerable damage ranging from a scoring of the exterior surface to a substantial flattening or collapse of the button structure. In the use of drift pins, not only was the force delivered against the push button sufficient to destroy the usefulness of the button but, quite often, mishaps would occur which would cause severe scratching or gouging of the watch case, deformation of the threads of the case or similar types of damage.

Therefore, prior means for extracting push buttons from watch cases have not been found to be entirely satisfactory.

SUMMARY OF THE INVENTION

In general, the preferred form of the present invention comprises a pair of expansion pliers having a pair of handles joined by a hinge and each having a jaw extending forwardly therefrom on the same side of the hinge point as the handle. The first of the jaws has a surface for bearing against an inner portion of a watch case, while the opposite jaw has a stud extending substantially at right angles thereto and away from the first jaw whereby closure of the handles forces the stud transversely of the watch case against the portion of the push button interior of the watch case. Preferably, the stud has a recessed portion in the center part of the face which engages the push button so that the peripheral portion of the face bears against the sleeve or main body of the push button.

OBJECTS OF THE INVENTION

It is an object of the present invention to provide an inexpensive tool for extracting push buttons from watch cases.

It is a further object of the invention to provide a tool which will abut a portion of a watch case transversely opposite the push button to be removed and apply a pressing force outwardly against the push button.

It is another object of the present invention to provide a tool which engages a main structural portion of a push button without contact with delicate movable portions thereof.

It is another object of the present invention to provide a tool for removing push buttons from watches without damage to either the push button or the watch case while applying an ejecting force along a line substantially parallel to the axis of insertion of the push button.

It is yet another object of the present invention to provide a push button extracting tool having interchangeable push button-engaging members.

BRIEF DESCRIPTION OF THE DRAWINGS

These and other objects of the invention may be better understood from the following description and accompanying drawings in which.

DETAILED DESCRIPTION OF THE PREFERRED EMBODIMENT

Figure 1:
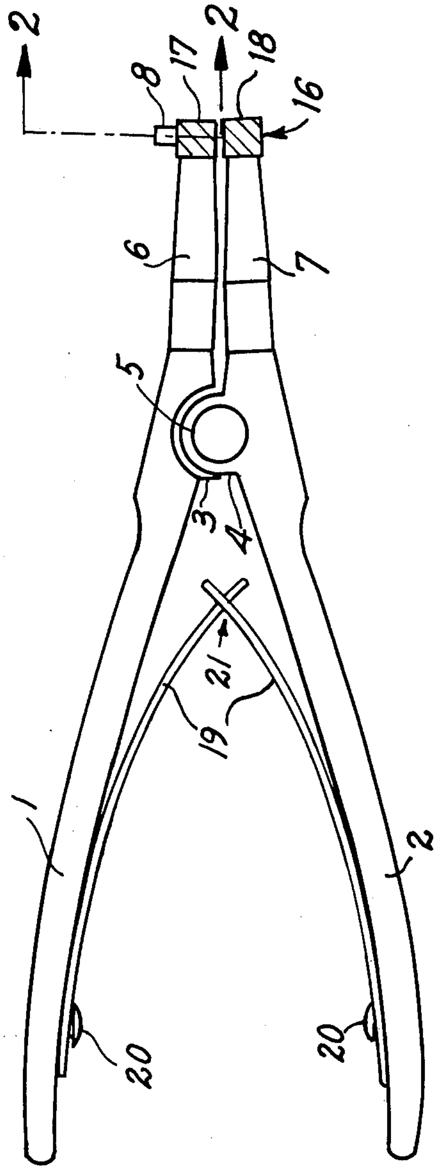
FIG. 1 is a side view of a preferred form of push button extractor according to the present invention.
Figure 2:
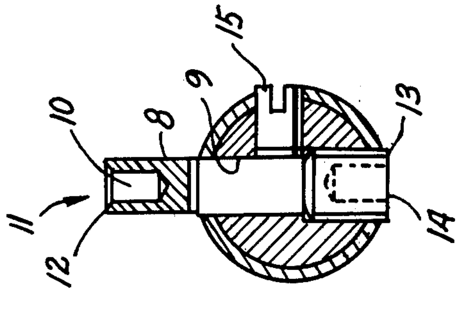
FIG. 2 is a sectional view of a portion of FIG. 1 taken along the lines to two of FIG. 1.

As shown in FIGS. 1 and 2, the preferred form of push button extractor of the present invention comprises a pair of handles 1 and 2 having hinged projections 3 and 4 extended towards each other to form a hinge with a hinge pin 5. The handles 1 and 2 have forward extensions or jaws 6 and 7, respectively, which extend on the same side of the axis of the hinge 5 as their respective handles.

The jaw 6 carries a stud 8 in a bore 9 which is generally perpendicular to the longitudinal axis of the tool and substantially at right angles to the axis of the hinge pin 5. As shown in FIG. 2, the stud 8 has a central recess 10 in its outer face 11 which forms an annular shoulder 12 for engaging the sleeve or main body portion of a push button. The stud 8 is secured in the jaw 6 by a threaded portion 13 engaging a threaded portion of the bore 9 and which preferably includes a hexagonal recess 14 for receiving an Allen wrench for driving the threaded portion into the bore. As shown, the stud is locked against rotation by means of a transverse set screw 15. It is to be understood, however, that any suitable means may be employed for mounting and locking the stud in the jaw.

The opposite jaw 7 carries a bearing or abutting surface 16 for engaging an inner portion of the watch case transversely across from the push button to be engaged by the stud 8. Preferably, the jaws 6 and 7 include cushion portions 17 and 18, respectively, which are formed of a relatively soft material such as rubber, plastic or nylon to avoid scratching or marring portions of the watch case.

Preferably, the handles 1 and 2 are biased away from each other by springs 19 which are secured by means of fasteners 20 and which abut each other at their forward ends 21. For convenience in manipulation of the tool during use, it is preferred that the springs 19 be mounted so that they can be swivelled out of an engagement by rotation about their fasteners 20.

In operation of the extractor of FIGS. 1 and 2, the forward positions of the jaws 6 and 7 are inserted in the watch case, the interfering contents of the watch case having been removed. The stud 8 is then placed against the innermost portion of the push button so that the shoulder 12 engages the sleeve or body of the push button and the handles are squeezed together carefully until the abutting surface 16 engages a portion of the watch case directly opposite the push button. With proper alignment of the stud and the abutting surface 16 with regard to the push button and the watch case, the handles 1 and 2 are then squeezed further, thereby applying a press-out, ejecting force on the base of the push button substantially directly along the axis of insertion of the button in the case. Relatively delicate, central portions of the push button such as stems, switch components or the like are received freely in the recessed portion 10 out of contact with the remainder of the stud 8 so that they are protected from damage by the expelling force of the unit.

Figure 3:
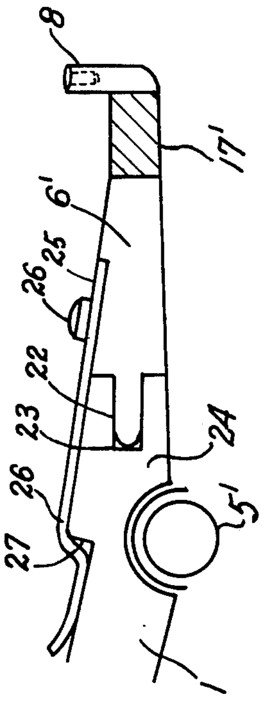
FIG. 3 is a side view of a modified version of the tool and including replaceable button-engaging tip.

As shown in FIG. 3, a modified form of jaw 6' includes a projection 22 for engagement in a recess 23 in the forward portion 24 of the handle 1'. The jaw 6' carries a leaf spring 25 mounted thereon such as by means of a screw 26 which extends rearwardly and terminates in an L-shaped portion 26 which engages the shoulder 27 on the handle 1'. The jaw 6' also includes an inwardly formed stud 8' at its forward end, as well as a shielding cushion 17' for protecting the watch case.

With the interchangeable form of jaw shown in FIG. 3, it is possible to provide a plurality of quick-change jaws to accomodate various types of diameters of push buttons without substantial time loss in removing and replacing different size or dimension studs. It is to be understood that other forms of quick-change joints and connections for interchangeable jaws may be employed, if desired.

It is apparent that the present invention provides a particularly advantageous extractor for push buttons in wrist watches and pocket watches which applies a safe but adequate ejecting force against the body of the push button in the direction in which the push button is removed from its aperature in the watch case while simultaneously protecting both the watch case and the push button and its components from marring or damage.

Various changes may be made in the details of the invention as disclosed, without sacrificing the advantages thereof or departing from the scope of the attendant claims.

What is claimed is:

1. An extractor tool for extracting watch push buttons having a sleeve and delicate central portions such as stems and switch components, said tool comprising a pair of levers each including a handle portion, and a forward extension, hinge means including a hinge intermediate said levers for separating said forward extensions when said handles are moved together, a first of said forward extensions having a stud mounted thereon on an axis generally perpendicular to the longitudinal axis of the tool, said stud having a pressing surface for engaging a push button, said pressing surface including a central recessed portion for freely receiving said delicate, central portions of said push button and a peripheral shoulder for engaging the sleeve of the push button, a shielding cushion surrounding the stud to protect a watch case with which the tool is used to extract a push button, and the other of said forward extensions having a cushioned abutment end opposite the stud and positioned to bear against a portion of the watch case directly opposite the push button when said stud is positioned against the push button.

2. The extractor tool of claim 1 in which said stud is detachable.

3. The extractor tool of claim 2 in which said stud is threadably mounted in said forward extension.

4. The extractor tool of claim 2 in which a portion of said first forward extension is detachable and said stud is an integral part of said detachable portion of the forward extension.

5. The extractor tool of claim 4 in which said detachable portion of the forward extension is secured by a spring.

6. The extractor tool of claim 2 including at least one spring for biasing said handle portions away from each other.

7. The extractor tool of claim 6 in which said spring is mounted by a fastener allowing said spring to be swiveled out of engagement by rotation to an inoperative position.

8. The extractor tool of claim 7 wherein said first forward extension has a shielding cushion thereon through which the stud projects.

* * * * *